United States Patent
Sofuoglu

(10) Patent No.: US 10,448,261 B2
(45) Date of Patent: Oct. 15, 2019

(54) METHOD FOR CAPACITY AND COVERAGE OPTIMIZATION OF A MULTI-RAT NETWORK

(71) Applicant: P.I. WORKS U.S., INC., Reston, VA (US)

(72) Inventor: Serkan Sofuoglu, San Ramon, CA (US)

(73) Assignee: P.I. WORKS U.S., INC., Reston, VA (US)

(*) Notice: Subject to any disclaimer, the term of this patent is extended or adjusted under 35 U.S.C. 154(b) by 0 days.

(21) Appl. No.: 15/865,468

(22) Filed: Jan. 9, 2018

(65) Prior Publication Data
US 2019/0215700 A1    Jul. 11, 2019

(51) Int. Cl.
| | | |
|---|---|---|
| *H04W 16/26* | (2009.01) | |
| *H04B 7/08* | (2006.01) | |
| *H04W 36/30* | (2009.01) | |
| *H04W 24/02* | (2009.01) | |
| *H04W 36/16* | (2009.01) | |
| *H04W 24/10* | (2009.01) | |

(52) U.S. Cl.
CPC .......... *H04W 16/26* (2013.01); *H04B 7/0817* (2013.01); *H04W 24/02* (2013.01); *H04W 36/165* (2013.01); *H04W 36/30* (2013.01); *H04W 24/10* (2013.01)

(58) Field of Classification Search
CPC ..... H04W 72/04; H04W 52/24; H04W 24/10; H04W 16/26
See application file for complete search history.

(56) References Cited

U.S. PATENT DOCUMENTS

| | | | |
|---|---|---|---|
| 8,301,149 B2 | 10/2012 | del Rio Romero et al. | |
| 8,665,835 B2 | 3/2014 | Hussein et al. | |
| 9,538,413 B2 | 1/2017 | Chou et al. | |
| 9,549,421 B2 | 1/2017 | Schmidt et al. | |
| 2010/0323723 A1* | 12/2010 | Gerstenberger | G01S 5/0226 455/456.5 |
| 2011/0130135 A1 | 6/2011 | Trigui | |
| 2013/0040648 A1* | 2/2013 | Yang | H04W 16/18 455/446 |
| 2015/0141027 A1* | 5/2015 | Tsui | H04W 52/243 455/452.1 |
| 2015/0156641 A1* | 6/2015 | Henderson | H04W 16/24 455/436 |
| 2015/0373563 A1* | 12/2015 | Chou | H04W 36/14 370/252 |
| 2016/0037370 A1* | 2/2016 | Futaki | H04W 16/18 370/252 |

\* cited by examiner

*Primary Examiner* — Julio R Perez
(74) *Attorney, Agent, or Firm* — Intrinsic Law Corp.

(57) ABSTRACT

A method for optimizing capacity and coverage in a target area of a multi-radio access technology (RAT) cellular network. In some aspects, the performance of the higher-generation RAT and that of the lower-generation RAT are each evaluated in order to optimize the capacity and coverage of the higher-generation RAT.

20 Claims, 11 Drawing Sheets

|   | A | B | C | D | E |
|---|---|---|---|---|---|
| 1 | UMTS + LTE | UMTS + LTE | UMTS + LTE | UMTS + LTE | UMTS + LTE |
| 2 | UMTS + LTE | UMTS only | UMTS only | UMTS only | UMTS + LTE |
| 3 | UMTS + LTE | UMTS only | UMTS only | UMTS only | UMTS + LTE |
| 4 | UMTS + LTE | UMTS only | UMTS only | UMTS only | UMTS + LTE |
| 5 | UMTS + LTE | UMTS + LTE | UMTS + LTE | UMTS + LTE | UMTS + LTE |

1000 ⟶

| MULTI-RAT SITE ID | MULTI-RAT SECTOR ID | CELL | RAT | SECTOR ID | CARRIER ID |
|---|---|---|---|---|---|
| 1002 | 1002_S1 | 1002_S1C1_L | LTE | 1 | 1C |
| 1002 | 1002_S2 | 1002_S2C1_L | LTE | 2 | 1C |
| 1002 | 1002_S3 | 1002_S3C1_L | LTE | 3 | 1C |
| 1002 | 1002_S1 | 1002_S1C2_L | LTE | 1 | 2C |
| 1002 | 1002_S2 | 1002_S2C2_L | LTE | 2 | 2C |
| 1002 | 1002_S3 | 1002_S3C2_L | LTE | 3 | 2C |
| 1002 | 1002_S1 | 1002_S1C1_U | UMTS | 1 | 1C |
| 1002 | 1002_S2 | 1002_S2C1_U | UMTS | 2 | 1C |
| 1002 | 1002_S3 | 1002_S3C1_U | UMTS | 3 | 1C |
| 1002 | 1002_S1 | 1002_S1C2_U | UMTS | 1 | 2C |
| 1002 | 1002_S2 | 1002_S2C2_U | UMTS | 2 | 2C |
| 1002 | 1002_S3 | 1002_S3C2_U | UMTS | 3 | 2C |

FIG. 10

METHOD FOR CAPACITY AND COVERAGE OPTIMIZATION OF A MULTI-RAT NETWORK

TECHNICAL FIELD

The present disclosure generally relates to the field of wireless communication networks. More specifically, it relates to dynamically improving or optimizing the performance and robustness of such networks using a plurality of key performance indicators (KPI) calculated per multi-RAT sector during coarse problem area identification, and running MDT/trace measurements on identified coarse problem areas to find detailed problem areas for effective weak coverage identification and remedy actions.

BACKGROUND

Traditional mobile communication system (MCS) radio network optimization is done by extensive and expensive manual work such as drive/walk tests. In this setup, test terminals inside a car or a bag (in the case of a walk test) are used to perform numerous calls (voice, video, internet download/upload, etc.) and the results are logged to be input for a human user for post-processing. Apart from being inefficient in terms of lead time and capital costs, drive test based optimization provides coarse tuning options which cannot solve most of the network problems due to its limited sampling both in terms of time and space.

Optimization decisions that are based on individual drive test call results lack multipoint or regional analyses. On the other hand, non-drive test based prior art methods generally consider performance metrics (counters, KPIs) of a specific RAT (e.g., E-UTRAN). In a multi-RAT wireless communication network, configuration changes in one RAT can affect the performance of underlying RAT(s). Thus, there is a need for an efficient method which considers wireless communication radio network as a whole to find optimum network configuration to satisfy most of the network problems without causing additional harm due to unexpected indirect influence on other parts of the network.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method to be implemented in a computing device for optimizing capacity and coverage in a target area of a multi-radio access technology (RAT) cellular network, the method comprising: identifying multi-RAT sectors in the multi-RAT cellular network, each multi-RAT sector corresponding to at least a first cell that supports a first RAT and a second cell that supports a second RAT but that does not support the first RAT, the first and second cells being co-located and having cell azimuths within an acceptance margin of one another; analyzing multi-RAT sector key performance indicators (KPIs) of each multi-RAT sector to determine one or more worst-performing multi-RAT sectors; determining a location of weak coverage symptom events related with one or more worst-performing multi-RAT sectors; identifying a cellular network problem area for the first RAT in each of the one or more worst-performing multi-RAT sectors based, at least in part, on the location of the weak-coverage symptom events and the bin KPIs; updating configuration parameters of one or more cells of multi-RAT sector that support the first RAT to improve a signal level in each cellular network problem area; and operating the multi-RAT cellular network with the updated configuration parameters.

In one or more embodiments, the multi-RAT sector KPIs include (1) a ratio of RRC (radio resource control) setup failures to total RRC setup establishment attempts on the first RAT (ERrc % AccFail), (2) a ratio of abnormal first RAT call terminations due to EnB to total call releases on the first RAT (ERab % Drop), (3) a ratio of UE (user equipment) context inter radio access technology (IRAT) relocation successes from the first RAT to the second RAT to total first RAT UE context establishments (Irat % Reloc), and (4) a ratio of first RAT-capable UE traffic in an RRC connected state served by all second RAT carrier(s) belonging to the multi-RAT sector to all UEs served in second RAT carriers in the RRC connected state (Served % NotOnFirstRAT). In one or more embodiments, analyzing the multi-RAT sector KPIs comprises calculating a unified cost metric based on the multi-RAT sector KPIs.

In one or more embodiments, the method further comprises dividing each worst-performing multi-RAT sector into a plurality of geographical bins. In one or more embodiments, the method further comprises calculating a weak-coverage degree per bin using a unified cost metric per bin, the unified metric based on bin KPIs. In one or more embodiments, the bin KPIs include ERabDrop and IratReloc. In one or more embodiments, the weak coverage symptom events include at least one of (a) a count of inter radio access technology (IRAT) redirection events per bin, (b) a count of abnormal call releases per bin, the count of abnormal call releases per bin measured on the first RAT, or (c) a received power measurement of user equipment located in each bin, the user equipment communicating on the first RAT.

In one or more embodiments, the method further comprises identifying a coverage compensator cell for each problem area, the coverage compensator cell supporting the first RAT. In one or more embodiments, the method further comprises updating the configuration parameters of each coverage compensator cell to increase its signal coverage area. In one or more embodiments, the updated configuration parameters include at least one of an electrical tilt increase of an antenna for the coverage compensator cell or a coverage compensator cell power increase. In one or more embodiments, the method further comprises excluding one or more cells from the configuration parameters update. In one or more embodiments, the method further comprises identifying a polluter cell for at least one of the problem areas, the polluter cell supporting the first RAT.

In one or more embodiments, the method further comprises updating the configuration parameters of the polluter cell to decrease its signal coverage area. In one or more embodiments, the updated configuration parameters include at least one of an electrical tilt decrease of an antenna for the polluter cell or a polluter cell power decrease. In one or more embodiments, the method further comprises excluding one or more cells from the configuration parameters update.

In one or more embodiments, the method further comprises identifying an overshooter cell in the target area; updating configuration parameters of the overshooter cell to decrease its signal coverage area. In one or more embodiments, the method further comprises identifying an undershooter cell in the target area; and updating configuration parameters of the undershooter cell to increase its signal coverage area. In one or more embodiments, the first RAT is an Nth generation mobile communication system and the second RAT is an N-1th generation mobile communication system. In one or more embodiments, the first RAT is LTE and the second RAT is UMTS.

Another aspect of the invention is directed to a non-transitory computer-readable medium having stored thereon program instructions that, when executed by a computer system, cause the computer system to: identify multi-radio access technology (RAT) sectors in a multi-RAT cellular network, each multi-RAT sector corresponding to at least a first cell that supports a first RAT and a second cell that supports a second RAT but that does not support the first RAT, the first and second cells being co-located and having cell azimuths within an acceptance margin of one another; analyze multi-RAT sector key performance indicators (KPIs) of each multi-RAT sector to determine one or more worst-performing multi-RAT sectors; determine a location of weak coverage symptom events related with the one or more worst-performing multi-RAT sectors; identify a cellular network problem area for the first RAT related with the one or more worst-performing multi-RAT sectors based, at least in part, on the location of the weak-coverage symptom events and the bin KPIs; update configuration parameters of one or more cells of the multi-RAT sector that support the first RAT to improve a signal level in each cellular network problem area; and operate the multi-RAT cellular network with the updated configuration parameters.

BRIEF DESCRIPTION OF THE DRAWINGS

For a fuller understanding of the nature and advantages of the present concepts, reference is made to the following detailed description of preferred embodiments and in connection with the accompanying drawings, in which:

FIG. 10 illustrates an example of a site configuration for a 6-cell (2 carrier×3 sector) LTE and 6-cell (2 carrier×3 sector) UMTS co-located site according to one or more embodiments.

DETAILED DESCRIPTION

Cellular networks often include a lower-generation radio access technology (RAT) that underlies a higher-generation RAT. For example, the lower-generation RAT can be a N-Xth (e.g., N-1, N-2, etc.) generation RAT and the higher-generation RAT is an Nth generation RAT. In a specific example, the lower-generation RAT can be UMTS (e.g., a 3rd generation RAT) and the higher-generation RAT can be LTE (e.g., a 4th generation RAT). Embodiments of this invention evaluate the performance of both the higher- and lower-generation RATs to optimize the capacity and coverage of the higher-generation RAT. Specific embodiments are disclosed herein with reference to LTE and UMTS networks as an example of the higher- and lower-generation RATs. However, the invention is not limited to these types of networks. Those skilled in the art will appreciate that the principles of this disclosure are applicable to other higher- and lower-generation RATs.

Figure 1:
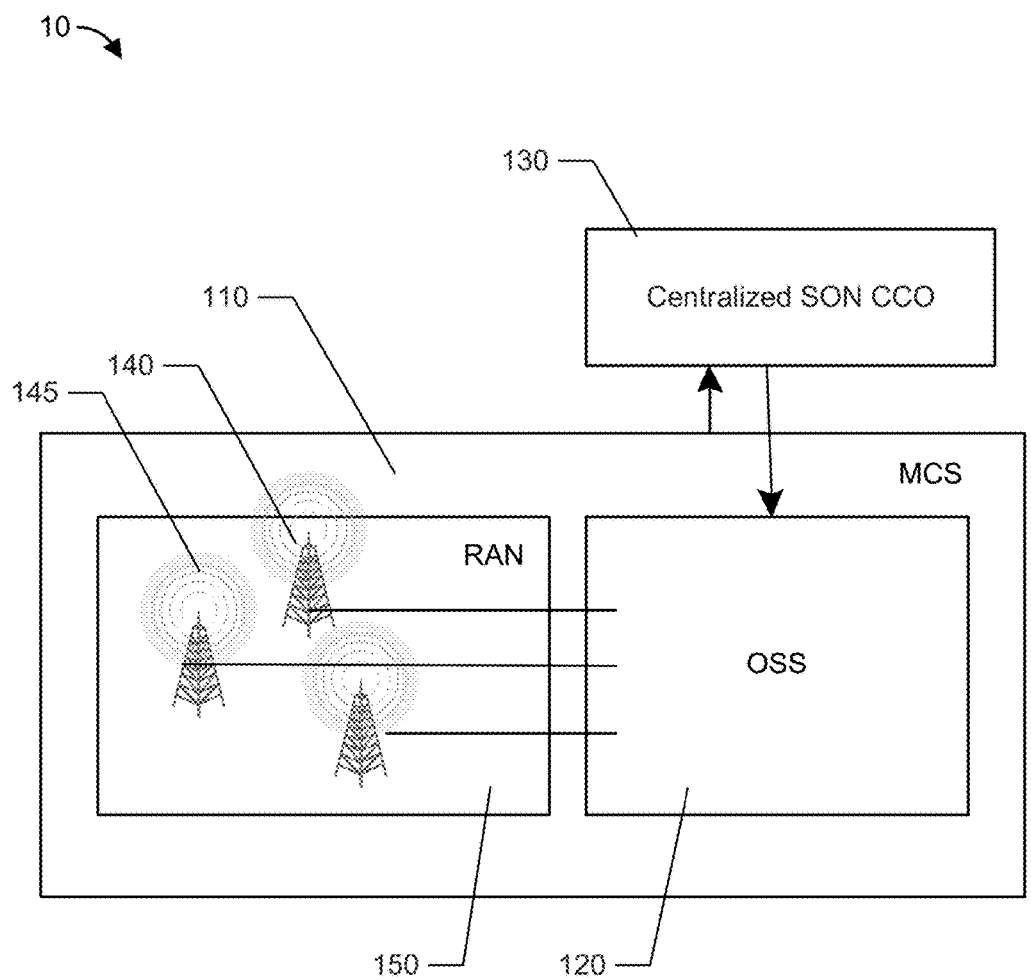
FIG. 1 schematically illustrates a capacity and coverage optimization (CCO) system according to one or more embodiments.

FIG. 1 schematically illustrates a capacity and coverage optimization (CCO) system 10 according to one or more embodiments. The system 10 includes a centralized self-organized network (SON) CCO processor 130, which autonomously and dynamically executes programmed operations and instructions according to the design of the CCO system 10 in certain embodiments disclosed herein. The operational support system (OSS) 120 contains data regarding the performance and configuration of the mobile communication system (MCS) 110. Base station node 140 generates cellular signals 145 that permit communication between mobile units (e.g., cellular mobile telephone subscriber devices) and the wider telephony network. These nodes are sometimes called "NodeB" for Third Generation MCS (e.g., Universal Mobile Telecommunications System (UMTS)) or "eNodeB" for Fourth Generation MCS (e.g., Long Term Evolution (LTE)). The base station nodes 140 collectively define a radio access network (RAN) 150. A communications link, such as an X2 link (e.g., in 4G LTE), can be formed between neighboring base station nodes 140.

The general operation and function of the system can be understood by analyzing the main symptoms of CCO problems such as (a) coverage holes, (b) overshoot coverage, and (c) pilot pollution.

A coverage hole can be (a) an area where the strength of pilot signals (cell reference signal for LTE) of LTE is below a minimum threshold required by a user equipment (UE) to access the network or (b) an area where signal-to-interference-plus-noise ratio (SINR) of received signals is below a level needed to maintain a carrier grade basic service. Coverage holes can be caused by bad RF planning, cell configuration settings, and/or physical constructions (new buildings, new trees, growing leaves). If there is no underlying radio access technology (RAT) for the LTE network, such as UMTS, then UEs will experience radio link failures and eventually call drops around the coverage holes after unsuccessful radio resource control (RRC) re-establishment mechanisms in LTE. If an underlying RAT exists, which is the case in most MCSs worldwide, then coverage holes in LTE will cause multi-RAT UEs to move to other RATs (e.g., from LTE to UMTS when there is a hole in LTE coverage).

During this transition, depending on operator border threshold settings about when to start measuring inter radio access technology (IRAT) frequencies and when to perform IRAT handover, UEs may also experience call drops and radio-link failures around the coverage hole.

Figure 2:
FIG. 2 illustrates a schema layout of a sample bins having "UMTS and LTE" and "UMTS only" type service coverage.

FIG. 2 illustrates a schema layout 20 of a sample bins (e.g., 50 meter by 50 meter width) having "UMTS and LTE" and "UMTS only" type service coverage. The bins addressed as B2, B3, B4, C2, C3, C4, D2, D3, D4 indicate LTE coverage gap areas whereas the rest are LTE service areas. A further classification of non-LTE coverage areas can be done for C3 as an inner coverage gap, due to no proximity to a nearby LTE service area. The remaining LTE coverage gap areas (i.e., B2-B4, C2, C4, and D2-D4) can be called coverage gap borders. Due to standard counter specifications as addressed in, i.e., 3GPP, the prior art uses IRAT handover or IRAT release indications as a measure of LTE coverage gap indication. There are two problems in this approach. (1) There may be two scenarios where one user experiencing an LTE to UMTS IRAT redirection event will return to LTE after a short time period whereas other user will stay on UMTS for a longer duration. In this case, using mobility KPIs like IRAT events as an indicator of LTE coverage gaps will be misleading. (2) Using IRAT handover and/or relocation events as a measure for LTE coverage gaps is not applicable for LTE inner coverage gaps as shown with C3 in FIG. 2.

Another symptom of CCO problems is overshoot coverage which occurs when coverage of a cell reaches far beyond what is planned. It can occur as an "island" of coverage in another cell which may or may not be a direct neighbor. The main reasons of overshoot are incorrect cell configurations, or geographical conditions (reflections from billboards, buildings, floating over open water, lakes). UEs served by overshoot coverage may suffer call drops, network access failures and low throughput. Correspondingly, undershoot coverage may also occur when a cell has a very limited service area due to incorrectly applied excessive downtilt which will lead to call drops and high number of IRAT events on cell border areas.

Pilot pollution occurs where areas receiving a number of pilot signals (cell reference signal for LTE), that are close to the pilot signal level of serving cell, cause the interference level to go up while UE and cell performance going down. As a result of pilot pollution, SINR gets worse, call drops increase, and user application usage experience degrades.

Figure 3:
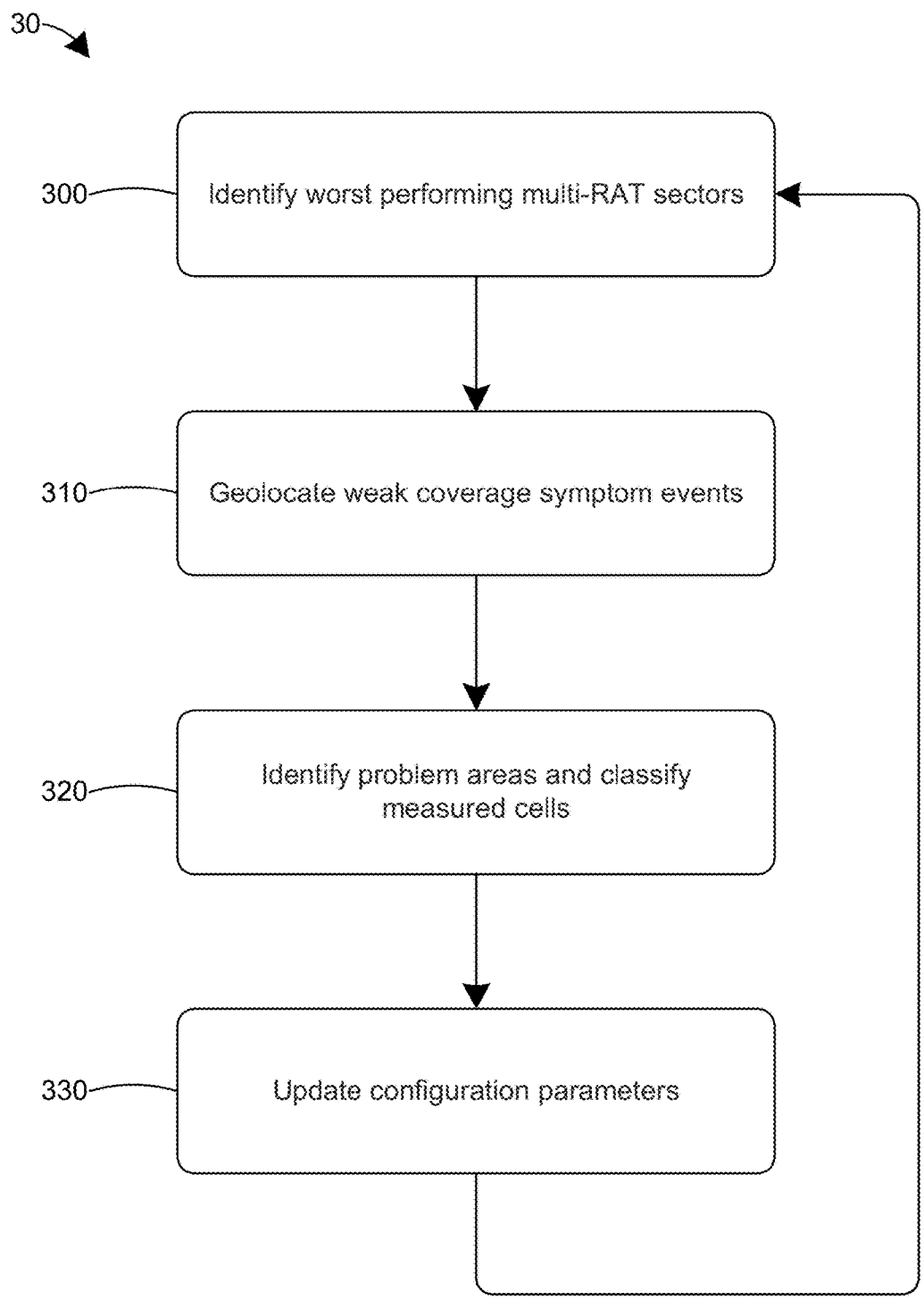
FIG. 3 is a flow chart for a method for capacity and coverage optimization of a multi-RAT network according to one or more embodiments.

FIG. 3 is a flow chart 30 for a method for capacity and coverage optimization of a multi-RAT network in a target area according to one or more embodiments. The method according to flow chart 30 can be implemented by a computer such as SON CCO processor 130.

In step 300, the worst-performing multi-RAT sectors are identified. Multi-RAT sectors correspond to co-located LTE and UMTS cells having antennas facing the same or a similar angular direction (i.e., azimuth). For areas where LTE and UMTS cell azimuths do not match 100%, an acceptance margin (e.g., +/−30 degrees) can be applied to decide if multi-RAT sector grouping applies or not.

A traditional way for a CCO implementation is to measure one or more key performance indicators (KPI) at the cell level horizontally for a specific carrier frequency and check if the results are getting better or worse after implementing changes. This approach may be suitable for a one-carrier one-RAT deployment but mobile carriers typically have a number of RATs (e.g., E-UTRAN-Evolved UMTS Terrestrial Radio Access Network for LTE, UTRAN-UMTS Terrestrial Radio Access Network for UMTS-Universal Mobile Telecommunications System) and a number of carriers per RAT. Operators make use of various cell- and relation-based configuration parameters to control traffic distribution on carriers of different RATs deployed. Thus, in an aspect of the invention, instead of one carrier analysis specific for LTE, grouped performance of multi-RAT cell carriers pointing to the same or a similar direction (e.g., as discussed above) can be evaluated. This multi-RAT sector based analysis can use a number of KPI trends such as: (a) the ratio of RRC (Radio Resource Control) setup failures to total RRC setup establishment attempts on LTE (ERrc % AccFail); (b) the ratio of abnormal LTE call terminations due to EnB to total call releases on LTE (ERab % Drop); (c) the ratio of UE context inter radio access technology (IRAT) relocation successes from LTE to other RATs to total LTE UE context establishments (Irat % Reloc); (d) the ratio of LTE capable UE (User Equipment) traffic in RRC connected state served by all UMTS carrier(s) belonging to multi-RAT sector to all UEs served in UMTS carriers in RRC connected state (Served % NotOnLTE). Stated more generally, the multi-RAT sector based analysis can use a number of KPI trends such as (1) the ratio of RRC setup failures to total RRC setup establishment attempts on the first RAT (ERrc % AccFail), (2) the ratio of abnormal first RAT call terminations due to EnB to total call releases on the first RAT (ERab % Drop), (3) the ratio of UE context IRAT relocation successes from the first RAT to the second RAT to total first RAT UE context establishments (Irat % Reloc), and (4) the ratio of first RAT-capable UE traffic in an RRC connected state served by all second RAT carrier(s) belonging to the multi-RAT sector to all UEs served in second RAT carriers in the RRC connected state (Served % NotOnFirstRAT).

A UE is in an RRC connected state when the UE interacts with the network (e.g., due to uploading, downloading, or signaling). A weight can be applied to each KPI per multi-RAT sector to derive a unified cost metric to be minimized in the target area, for example as a result of automated change actions. For example, the unified cost metric can be expressed as CostCCO=w1*(ERrc % AccFail)+w2*(ERab % Drop)+w3*(Irat % Reloc)+w4*(Served % NotOnLTE), where w1–w4 are the weights or cost coefficients assigned to the respective KPIs. In one non-limiting example, w1–w4 are each 0.25. In another example, not all of the cost coefficients are identical. After sorting by descending cost per multi-RAT sector, the worst-performing sectors in the area of interest in terms of CCO can be identified.

Step 300 can optionally include identifying overshooter cells and undershooter cells, as discussed below.

In step 310, weak coverage symptom events in the worst-performing sectors are geolocated. The weak coverage symptom events can include UE Context IRAT relocation/redirection events (e.g., when a UE is redirected from LTE to UMTS due to UE received signal strength being below a set threshold) and abnormal call releases (e.g., due to dropped calls as a result of poor RSRP/RSRQ) as indicated in cell MDT (minimization of drive tests)/trace data. Each weak coverage symptom event can be correlated with a geographical location of the UE (e.g., based on GPS data from the UE or by another geolocation mechanism). As a result, geographical bins (e.g., 50 m×50 m) in the subset of the target area can be produced that will contain a mapping of geolocated MDT (minimization of drive tests)/trace events including but not limited to the count of IRAT redirection events per bin, the count of abnormal call releases (e.g., on the LTE network) per bin, and geolocated UE reported Radio Resource Control (RRC) Measurement Reports (MRs) which will be used later to form an interaction table. The geolocated MRs (RSRP, RSRQ, PCI triplet(s) as reported from UE with RRC signaling) contains UE received signal levels from each measured E-UTRAN cell such as Reference Signal Received Power (RSRP) and Reference Signal Received Quality (RSRQ).

In step 320, problem areas are identified and measured cells inside problem areas are classified. A unified weak coverage indication per bin can be used to calculate weak-coverage degree per bin for the LTE network. For example, the unified weak coverage indication per bin can be determined by taking a weighted sum of abnormal LTE call terminations due to EnB (ERabDrop) under weak coverage and IRAT redirection/relocation successes from LTE to other RATs (IratReloc). The % Nth worst percentile of identified weak coverage bins can be selected by sorting unified weak coverage indication per bin in descending order and taking top worst bins (e.g. top 50% percentile) for analysis. Clusters of weak-coverage bins are then identified based on the grouping of selected worst bins.

In addition, an interaction table can be used to classify the measured cells as compensating candidates or polluters. The interaction table can be based on MDT/trace data of calls collected under each problem area. The interaction table can include cell-ncell measurements (e.g., serving cell (RSRP, RSRQ), neighbor cell(s) (RSRP, RSRQ), and type of weak-coverage symptom (e.g., IRAT redirection, call drop under weak signal). An operator-configurable knowledge base and/or artificial intelligence rules can then be applied on the interaction table to classify each measured cell as a compensating candidate, a polluter, and (optionally) an overshooter, and/or an undershooter. The classification of compensation candidates and polluters is further described below with respect to FIG. 8 (step 324). The classification of overshooters and undershooters is further described below with respect to FIG. 4 (step 303).

In an aspect, a compensating candidate can be a cell ranked highest amongst possible candidates in terms of candidate cell distance to geolocated weak coverage symptom events, candidate's relative position of antenna azimuth to event location, serving and candidate cell's RSRP measurements at event geo-location, existing electrical tilt and/or RS power configurations. A polluter can be a cell that is detected in a problem area from a remote distance. If detection density of one or more polluters in a remote problem area is above a pollution threshold (e.g. 5%) than corresponding actions for the polluter can be taken.

In step 330, the configuration parameters of the cells categorized as coverage compensators, polluters, and (optionally) overshooters and undershooters are updated. Configuration parameter updates that result in coverage shrink actions are implemented for overshooter and polluter cells whereas configuration parameter updates that result in coverage extension actions are applied for undershooter and coverage compensator cells. A coverage shrink action can include an electrical tilt increase (e.g., downtilt) of the antenna for the LTE cell and/or cell power decrease (e.g., reference power and/or power boost reduction) of the LTE cell. A coverage extension action can include an electrical tilt decrease (e.g., uptilt) of the antenna for the LTE cell and/or cell power increase (e.g., reference power and/or power boost increase) of the LTE cell. The degree of change per iteration can be configurable by the operator as a step size parameter (e.g., +/−2 degree etilt, 1 dB RS power, power boost index change by 1) together with minimum and/or maximum boundary settings (e.g., maximum electrical tilt supported by an antenna may differ and can be stored in site/cell/antenna database, minimum and maximum RS power setting allowed per cell). In some embodiments, one or more cells can be excluded from the configuration parameter updates.

The method of flow chart 30 can be performed in an open-loop or a closed-loop configuration. In the open-loop configuration, the computer (e.g., SON CCO processor) performs the steps of flow chart 30 and the human user of the CCO determines whether to implement the updated configuration parameters. In the closed-loop configuration, the computer (e.g., SON CCO processor) performs the steps of flow chart 30 and then implements the updated configuration parameters automatically.

Figure 4:
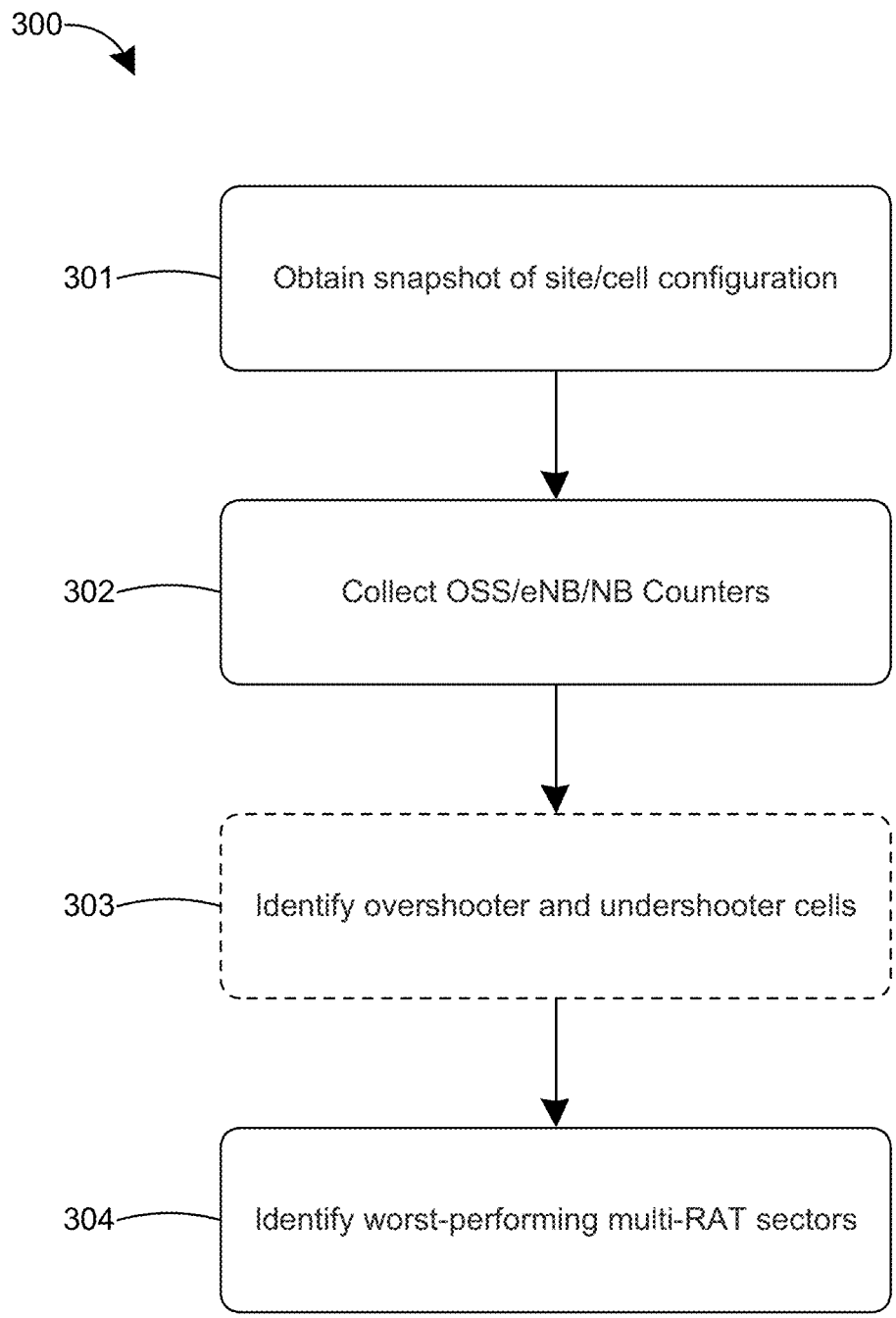
FIG. 4 is a flow chart that illustrates details of step 300 in FIG. 3 according to one or more embodiments.

FIG. 4 is a flow chart that illustrates details of step 300 in FIG. 3 according to one or more embodiments. In step 301, a snapshot (e.g., a daily snapshot) of site/cell configuration information is obtained. The snapshot can include the site name, cell name, technology, cell id, physical cell identity (e.g., PCI for LTE, PSC for UMTS), azimuth, antenna type, antenna horizontal & vertical beam width, height above sea level, geographic coordinates (e.g., longitude, latitude), electrical antenna tilt, mechanical antenna tilt, and cell power configurations (e.g., LTE cell reference signal (RS) power setting, LTE RS power boost setting). Static data such as the site name, cell name, technology, cell id, physical cell identity, azimuth, antenna type, antenna horizontal & vertical beam width, height above sea level, geographic coordinates (e.g., longitude, latitude), and mechanical antenna tilt can be obtained from operators' radio network design/planning software, such as Atoll servers. Centralized CCO SON processor fetches this data from Atoll exports. Dynamic data such as electrical antenna tilt and cell power configuration can be obtained from OSS via Configuration Management (CM) interfaces/files. An example of a site configuration 1000 for a 6-cell LTE and 6-cell UMTS co-located site is illustrated in FIG. 10. The Multi-RAT Sector Id is a sector-based grouping of all cells having the same (or close (e.g., within 30% or less) antenna azimuth. For example, Multi-RAT Sector Id 1002_S1 includes LTE cells 1002_S1C1_L, 1002_S1C2_L and UMTS cells 1002_S1C1_U, 1002_S1C2_U.

In step 302, cell and relation-based OSS counters regarding LTE and UMTS cells can be collected during one or more observation periods (e.g., N×15 minutes, N=1, 2, 3, etc. for the target area). These PM (performance management) data (e.g., call attempts, call setup failures, call abnormal releases, handover attempts, etc.) on the cell level and the cell relation level (where applicable) can be produced in OSS and collected by the SON server with a minimum data reporting period (ROP) such as 15 min or 60 min (or other N×15 minutes) depending on operator configuration. The counters can include eNodeB and NodeB PM counters. The eNodeB PM counters can correspond to the performance management data of one or more E-UTRAN cells of one or more eNodeBs. The NodeB PM counters can correspond to the performance management data of one or more UTRAN cells of one or more NodeBs. The SON CCO server can obtain the eNodeB PM counters from an LTE OSS. The SON CCO server can obtain the NodeB PM counters from a UMTS OSS. In a specific example, CostCCO calculation can be performed by aggregating PM counters from 00:00 to 16:00 hrs during the observation day.

Figure 5:
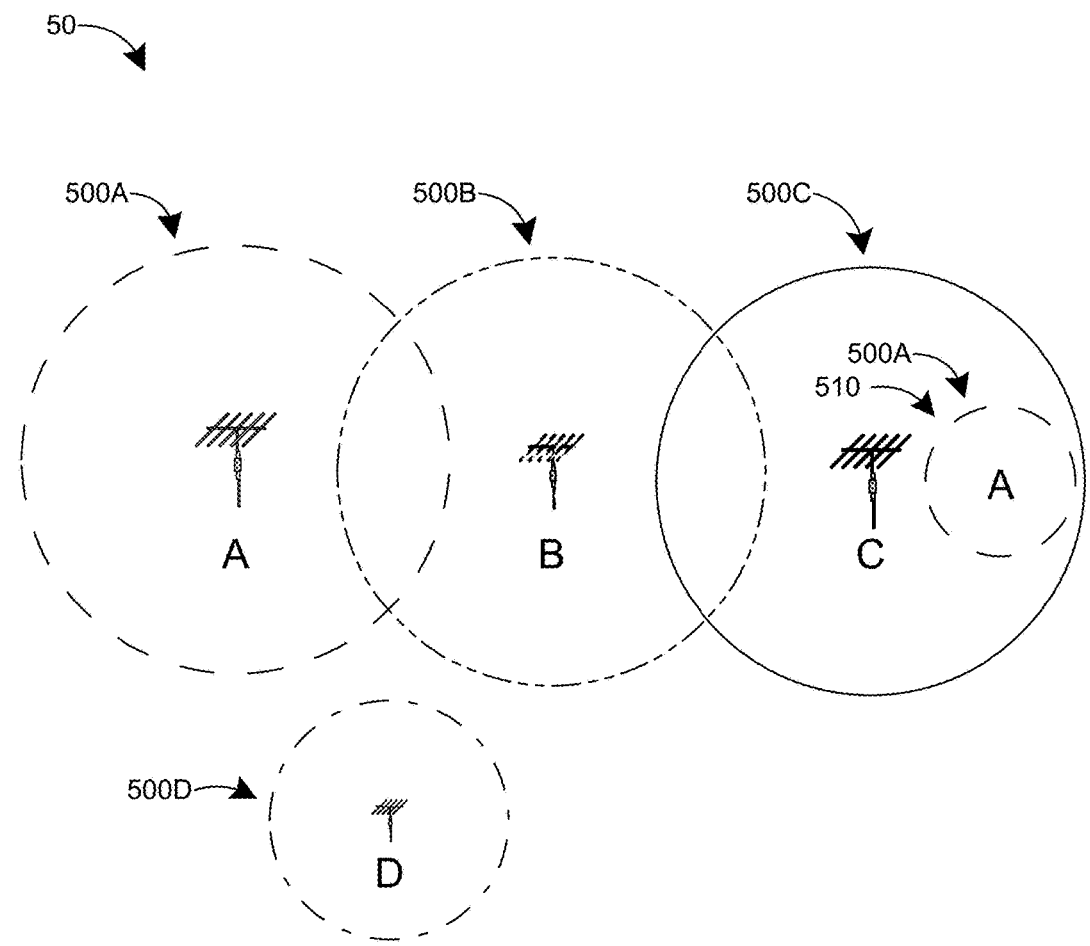
FIG. 5 illustrates an example of an overshooter cell and an undershooter cell according to one or more embodiments.

In optional step 303, overshooter and undershooter cells in the LTE network are identified. An overshooter cell can be a cell whose signal area reaches far beyond what is planned. It can occur as an "island" of coverage in another cell which may or may not be a direct neighbor (e.g., a second- or higher tier neighbor). An undershooter cell can be a cell whose signal area does not overlap with the signal area(s) of neighboring cell(s), which results in a gap or hole in cell coverage. An example of a site that includes an overshooter cell and an undershooter cell is illustrated in FIG. 5, which illustrates a signal area 50 having cells A, B, C, and D. The signal area 500A of overshooter cell A extends into at least a portion of the signal area 500B of its first-tier neighbor cell B and at least a portion of the signal area 500C of its second-tier neighbor cell C. The portion 510 of signal area 500A that extends into signal area 500C appears as an "island" of coverage in cell C. The signal area 500D of undershooter cell D does not extend into or overlap with the signal areas 500A-C of cells A-C, respectively.

In one example, an overshooter can be determined quantitatively by (1) averaging Tier-N neighbor (e.g., N=3 depending on average site to site distance in the region and Tier-3 neighbor is a "neighbor of a neighbor of a neighbor") distance of the cell; (2) using histogram-based OSS counter (s) to calculate overshoot distance as 90th percentile value of served TA (timing advance) distance for the cell; (3) calculating how many eNodeBs exist inside the region covered by a virtual slice facing antenna azimuth and having the same width as the antenna beamwidth with a length of e.g., 90th percentile value of served TA distance of the cell. In a specific example, if overshoot distance is greater than average Tier-3 neighbor distance and the number of eNodeBs inside the overshoot distance is higher than another threshold then it is indicative of an overshooter. In a specific example, if the 90th percentile value of the TA distribution histogram is less than the one third of the average Tier-1 cell neighbor distance (e.g., a Tier-1 neighbor is a direct neighbor), then that cell can be classified as an undershooter.

Figure 6:
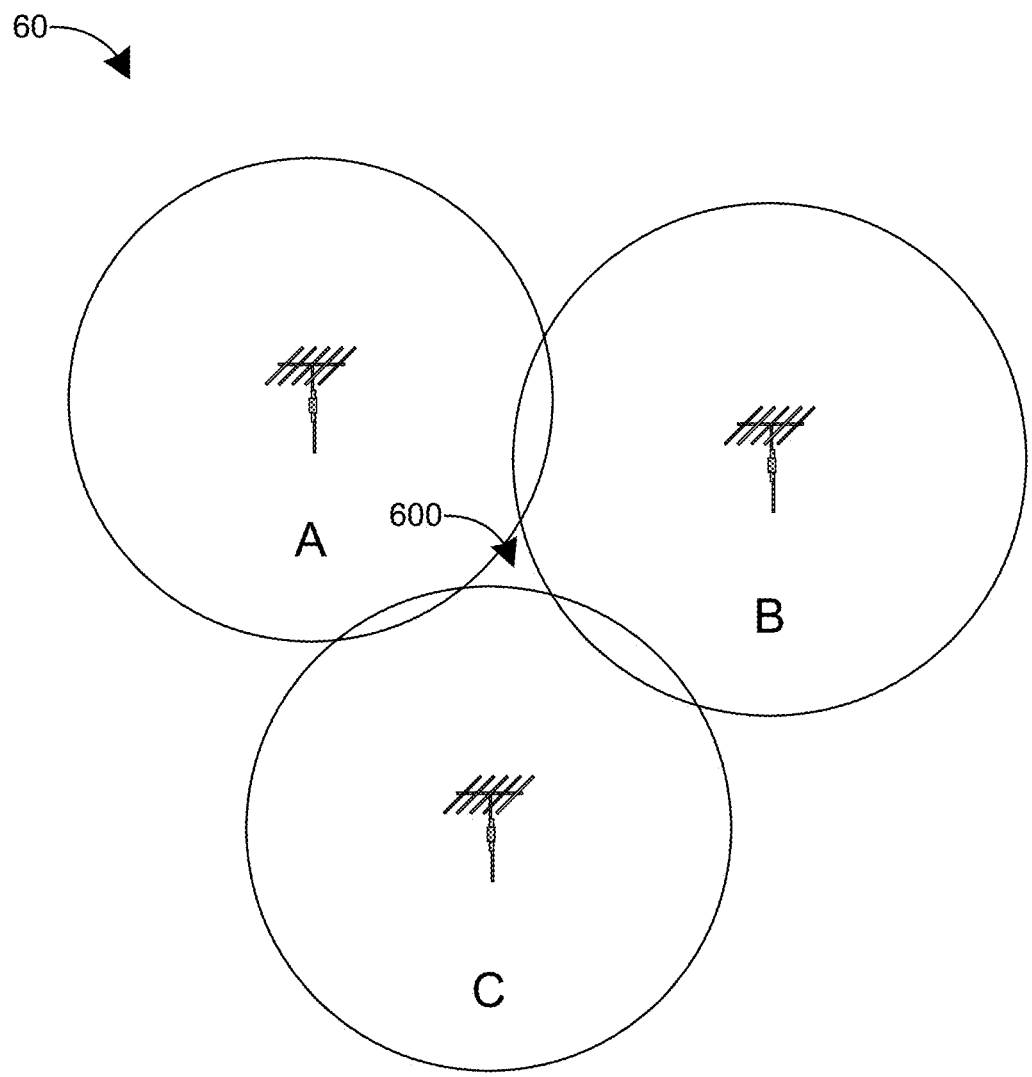
FIG. 6 illustrates an example of an LTE coverage gap according to one or more embodiments.

In one example, the signal areas of cells A-C illustrated in FIG. 6 correspond to an LTE service coverage map with a coverage gap region. Assuming an underlying RAT exists, LTE-capable UEs located in coverage gap region 600 are served by a non-LTE RAT (e.g., GSM, UMTS). Activity of these LTE-enabled UEs on non-LTE RAT form the penalty factor for CCO coverage as Served % NotOnLTE. In order to improve the situation, sector coverage for A, B and/or C can be extended to cover gap region 600. Improvement (i.e., reduction) on Served % NotOnLTE in this case is expected whereas, due to the increased number of served cell edge users, accessibility and retainability degradation can also occur. These KPIs are accounted for in the unified cost metric CostCCO discussed above.

Timing Advance (TA) is an inherent LTE radio access network measure used to keep LTE users in uplink synchronized state. An LTE base station (eNodeB) sends Timing Advance Alignment commands to UEs on different occasions (e.g., during initial access and ongoing call) in relation with their eNodeB estimated distance. The aggregated histogram-based TA measurements are included in OSS counters and can be used to identify overshooter or undershooter cells when correlated with site/cell antenna coordinates (longtitude, latitude) and antenna azimuth. Cells can then be ranked from most aggressive coverage (overshooters) to under coverage (undershooters) type.

In step 304, the worst-performing multi-RAT sectors are identified, as discussed above in step 300 (FIG. 3).

Figure 7:
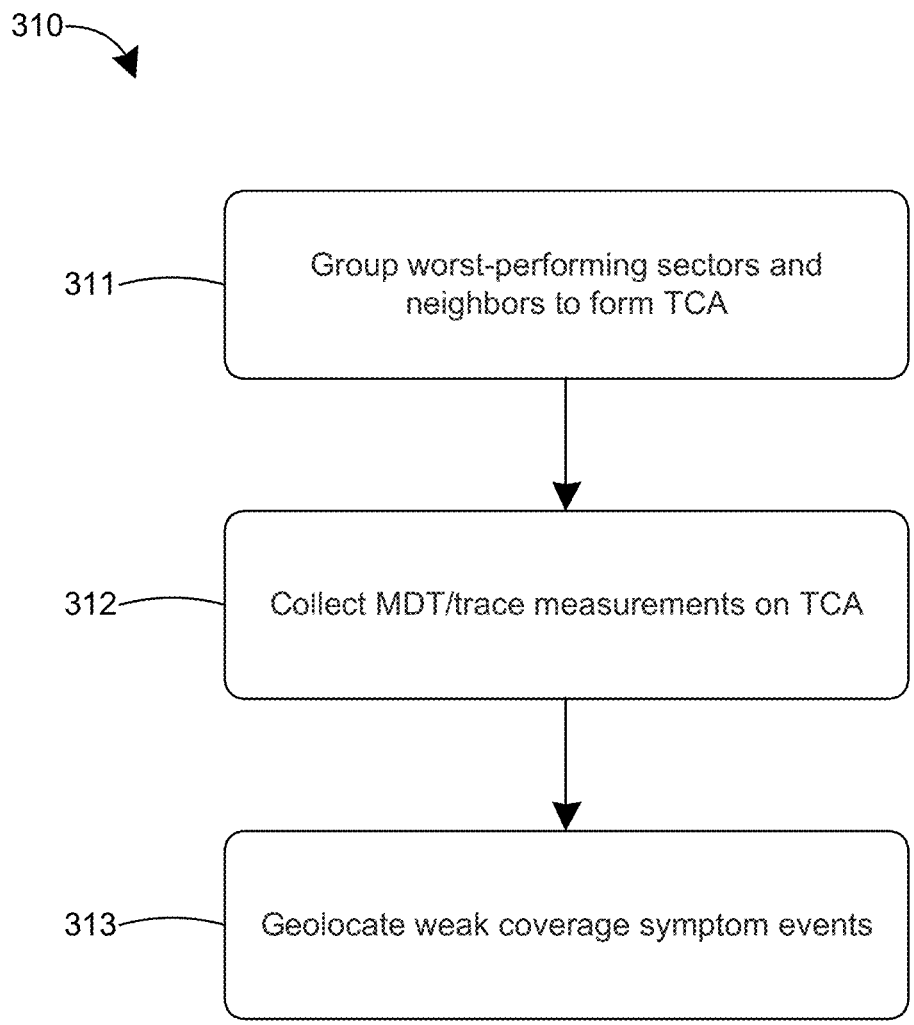
FIG. 7 is a flow chart that illustrates details of step 310 in FIG. 3 according to one or more embodiments.

FIG. 7 is a flow chart that illustrates details of step 310 in FIG. 3 according to one or more embodiments. In step 311, the worst-performing sectors and their neighbors are grouped to form a trace collection area (TCA). The LTE cells inside each worst-performing sector, the neighbors of the LTE cells inside each worst-performing sector, the neighbors of neighbors, and/or more neighbor derivations depending on choice where Tier-N neighbors (e.g., N=1 corresponds to neighbors, N=2 corresponds to neighbors of neighbors, etc.) can be grouped to identify a TCA which may be a subset of the selected target area.

In step 312, eNB(s) serving the TCA can be used to initiate and collect subscriber and cell trace data including MDT capability, for example as described in 3GPP specifications TS 32.421—TS 32.423 and TS 37.320 (available at http://www.etsi.org), which are hereby incorporated by reference. This trace data comprises subscriber reported events as measurement reports (MRs) including RSRP (Reference Signal Received Power), Reference Signal Received Quality (RSRQ), Physical Cell Identity (PCI), eNb logged call related events (e.g., call initiation, handover, call release). These events can be initiated for collection on TCA using Immediate MDT/trace procedures during afternoon peak hours (e.g., 17:00-18:00) in observation day.

In step 313, weak coverage symptom events are identified and geolocated. As discussed above, weak coverage symptom events can include UE Context IRAT relocation/redirection events (e.g., when a UE is redirected from LTE to UMTS due to UE received signal strength being below a set threshold) and abnormal call releases (e.g., due to dropped calls as a result of poor RSRP/RSRQ) as indicated in cell MDT (minimization of drive tests)/trace data. Each weak coverage symptom event can be correlated with a geographical location of the UE (e.g., based on GPS data from the UE or by another geolocation mechanism). For example, the MDT standard includes an option for Global Navigation Satellite Systems (GNSS)-based location reporting from UEs. The availability of GNSS location information is subject to UE capability and/or UE implementation. Additionally, any CCO solution requiring location information will result in additional power consumption of the UE due to the need to run its positioning components. Alternatively, an inherent geolocation mechanism can be provided by correlating site/cell/antenna layout/configuration with collected MDT/trace data that does not include location information. In either case, geographical bins (e.g., 50 m×50 m) in the subset of the target area can be produced that will contain a mapping of geolocated MDT (minimization of drive tests)/trace events including but not limited to the count of IRAT events per bin, the count of abnormal call releases per bin, and geolocated MRs (e.g., as discussed above).

Figure 8:
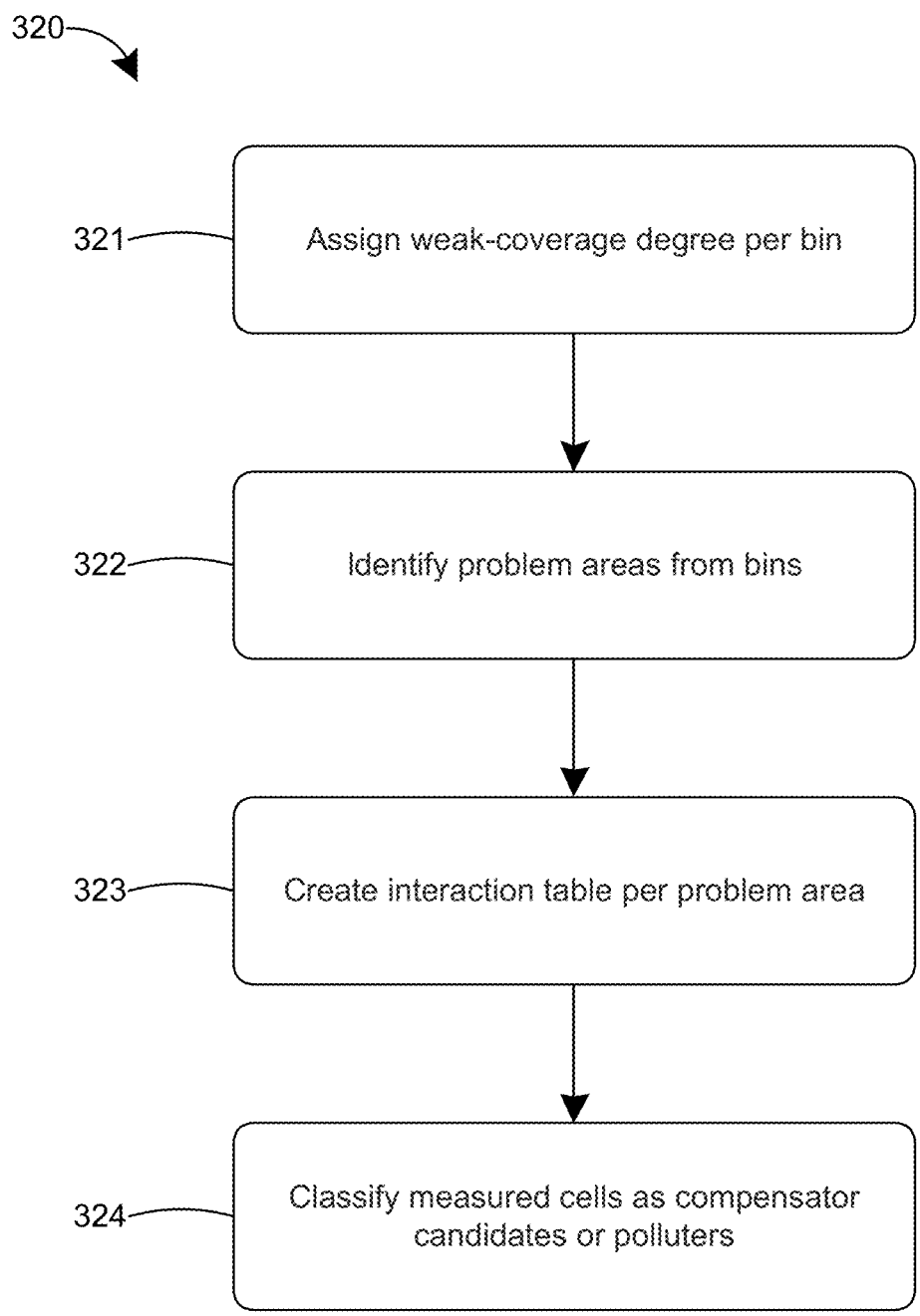
FIG. 8 is a flow chart that illustrates details of step 320 in FIG. 3 according to one or more embodiments.
Figure 11:
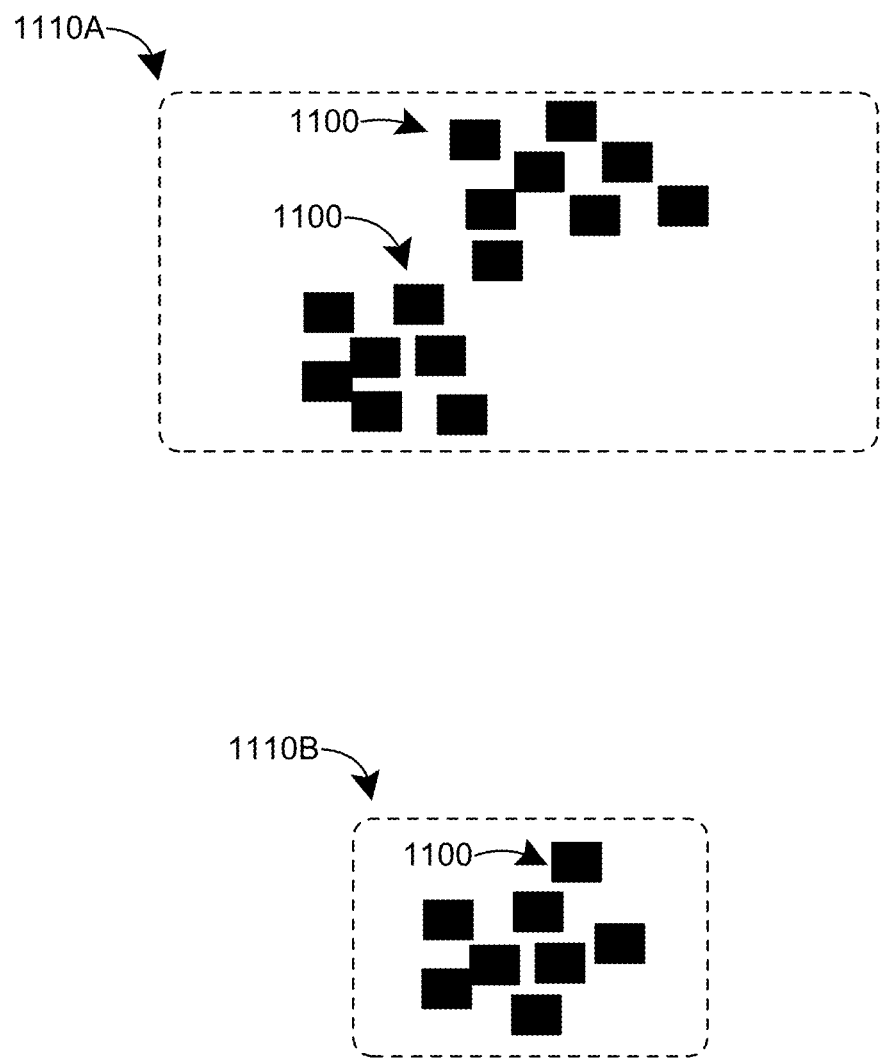
FIG. 11 is an example of a heat map of weak coverage symptom events according to one or more embodiments.

FIG. 8 is a flow chart that illustrates details of step 320 in FIG. 3 according to one or more embodiments. In step 321, a unified weak coverage indication per bin can be used to calculate weak-coverage degree per bin for the LTE network. For example, a comparison of the unified weak coverage indication cost metric for each bin can be used to rank the bins from worst to best coverage degree. In step 322, problem areas can be identified by analyzing clusters of weak-coverage bins from where worst PAs can also be derived. Problem area clusters can be determined based on two weak coverage symptom events: geolocated IRAT redirections and/or geolocated drops. A "heat map" of the weak coverage symptom events can be used to determine the clusters/grouping of the worst-performing locations, which are used to form the problem areas. An example of a heat map of weak coverage symptom events is provided in FIG. 11. In FIG. 11, each pixel or bin 1100 represents a high density of weak coverage symptom events. A problem area 1110A, 1110B is formed by each geographic cluster of pixels 1100.

In step 323, an interaction table is created. The interaction table can include cell-neighbor cell measurements (serving cell (RSRP, RSRQ, PCI), neighbor cell(s) (RSRP, RSRQ, PCIs), type of weak-coverage symptom event (IRAT redirection, drop due to weak signal)). The serving cell is the cell where the UE was being served before weak-coverage symptom event occurred.

In step 324, the measured cells are classified as compensator candidates or polluters. A compensator candidate can be a neighboring cell in the LTE network that may be able to cover a weak coverage area in a bin. A polluter can be a distant (i.e., non-neighboring) cell in the LTE network whose signal level is detected by the UE in the bin. The classification can be determined by applying an operator-configurable and/or artificial intelligence rules on the interaction table to classify the measured cells as compensating candidates or polluters. The difference of RSRP measurements of measured cells to served cells can be compared with a configurable pollution threshold (RSRPmeasured≥RSRPserved−pollution threshold (e.g., 4 dB)) to identify polluter candidates. Then, based on the distance to event location, detection frequency and/or other base station density in the area between measured cell and event location, polluter cells can be identified. The best coverage compensator cells per problem area can be found by ranking non-polluter and, optionally from step 303, non-overshooter categorized candidates in terms of their suitability taking into account factors such as the height of the candidate cell's antenna above sea level, existing etilt and/or power configuration, RSRP/RSRQ measurements at event location, distance to weak-coverage symptom event location, relative position of measured cell azimuth to weak-coverage symptom event location, and cell measurement share among all measurements in the problem area. Cell measurement share among all measurements in the problem area corresponds to the percentage contribution of the measurement of a cell in the problem area. For example, in Problem Area-X, composed of 15 bins, in total 4 measured neighbor cells (A, B, C, and D) are reported by UEs with the following ratio: 30, 20, 10, and 40, respectively. Then cell A measurement share in Problem Area-X is 30%. The maximum measurement share in this example is 40%.

A ranking algorithm can be used to find the most effective compensating cell candidates, for example as follows:

$$CompensationRank = \left[\frac{DistanceMin}{Distance} \times weightD\right] +$$
$$\left[\frac{Height - HeightMin}{HeightMax - HeightMin} \times weightH\right] +$$
$$\left[\frac{Etilt - EtiltMin}{EtiltMax - EtiltMin} \times weightET\right] +$$
$$\left[\left(1 - \left(\frac{RelativeAzimuth}{RelativeAzimuthMax}\right)\right) \times weightRelAz\right] +$$
$$\left[\left(\frac{MeasShare}{MaxShare}\right) \times weightMeasShare\right] +$$
$$\left[\left(\frac{RSRP\%50 - RSRPmin}{RSRPmax - RSRPmin}\right) \times weightRSRP\right]$$

In this equation, RelativeAzimuthMax is a configurable parameter (e.g., 65). DistanceMin is the distance to the closest candidate cell that was measured at the weak-coverage symptom event location. HeightMin and HeightMax are minimum and maximum height values of cells that were measured in the area. EtiltMin and EtiltMax are cell antenna maximum and minimum etilt capabilities based on deployed antenna type per cell. WeightD, WeightH, WeightET, WeightRelAz, WeightMeasShare, and WeightRSRP are weight settings which are typically summed to 1 (i.e., WeightD+WeightH+WeightET+WeightRelAz+WeightMeasShare+WeightRSRP=1) for distance, height, electrical tilt, relative azimuth, measurement share and RSRP respectively. RelativeAzimuth can be calculated by the difference of angular degree of two unit vectors, one pointing to geolocated weak coverage event point with origination on measured cell and the other unit vector having a direction as with measured cell azimuth. Cell measurement share (MeasShare) among all measurements in the problem area corresponds to the percentage contribution of the measurement of a cell in the problem area where maximum share (MaxShare) refers to the one having maximum contribution to overall measurements. RSRP % 50, RSRPmin and RSRPmax corresponds to median, minimum and maximum RSRP measurements for measured neighbor cell(s) per bin.

An example calculation for compensation rank gain is given in below table.

| PA id | Measured Cell Id | compensation rank gain | | | | | other PA polluter share | classification |
|---|---|---|---|---|---|---|---|---|
| | | BIN-1 | BIN-2 | BIN-3 | BIN-4 | BIN-1 TO 4 | | |
| 1 | 3 | 0.659 | 0.997 | 0.926 | 0.702 | 3.284 | 0.0952 | polluter |
| 1 | 4 | 0.592 | 0.195 | 0.695 | 0.571 | 2.053 | 0.005 | compensator (best) |
| 1 | 2 | 0.153 | 0.869 | 0.204 | 0.583 | 1.809 | 0.0295 | compensator |
| 1 | 1 | 0.583 | 0.112 | 0.306 | 0.479 | 1.48 | 0.0075 | compensator |
| 2 | 7 | 0.327 | 0.589 | 0.609 | 0.841 | 2.366 | 0.0541 | polluter |
| 2 | 8 | 0.028 | 0.612 | 0.812 | 0.225 | 1.677 | 0.0266 | compensator (best) |
| 2 | 6 | 0.773 | 0.738 | 0.037 | 0.009 | 1.557 | 0.0964 | polluter |
| 2 | 5 | 0.513 | 0.052 | 0.024 | 0.466 | 1.055 | 0.0475 | compensator |
| 3 | 12 | 0.23 | 0.891 | 0.877 | 0.339 | 2.337 | 0.04 | compensator (best) |
| 3 | 9 | 0.225 | 0.23 | 0.953 | 0.846 | 2.254 | 0.0425 | compensator |
| 3 | 11 | 0.758 | 0.658 | 0.46 | 0.328 | 2.204 | 0.0275 | compensator |
| 3 | 10 | 0.358 | 0.272 | 0.854 | 0.224 | 1.708 | 0.0658 | polluter |

Here we assume, pollution threshold is 5%. Bin based compensating rank values are summed to get compensating rank gain per measured cell per PA. One or more best compensation candidates can be classified as compensator. In this example, Cell id=3 is measured in Problem Area Id=1 with a highest rank of 3.284 but excluded as compensating candidate because it was also measured as 9.52% pollution share in other PAs.

Figure 9:
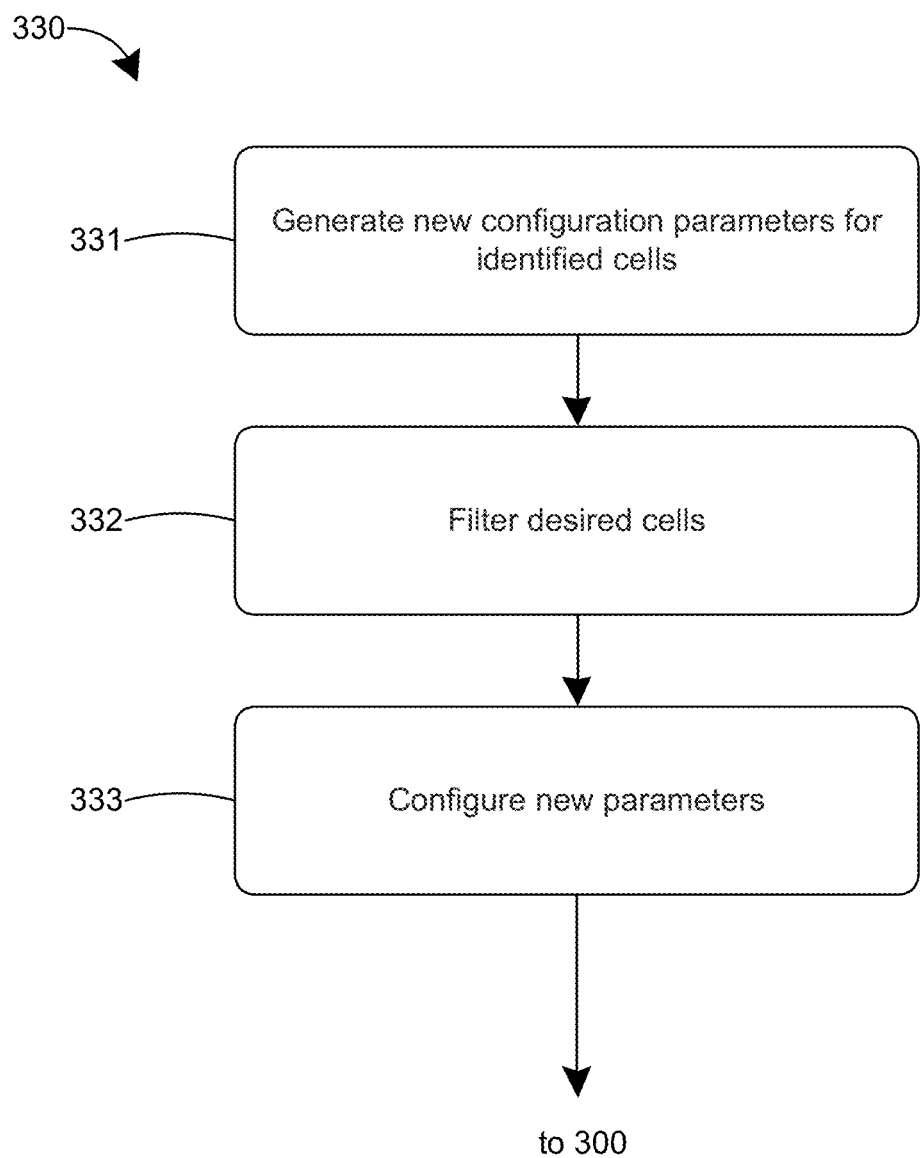
FIG. 9 is a flow chart that illustrates details of step 330 in FIG. 3 according to one or more embodiments.

FIG. 9 is a flow chart that illustrates details of step 330 in FIG. 3 according to one or more embodiments. In step 331, the configuration parameters of the cells categorized as coverage compensators, polluters, and (optionally) overshooters and undershooters are updated, as described above with respect to step 330. The categorization of cells as coverage compensators and polluters is described above (e.g., with respect to steps 320 and 324). The categorization of cells as overshooters and undershooters is described above (e.g., with respect to step 303 and 320). In step 332, certain desired cells in the LTE network can be filtered (e.g., removed) from the list of cells designated for configuration parameter updates. For example, some cells can be removed from the list of cells designated for configuration parameter updates due to temporary cell availability problems (e.g. backhaul related problems) during the observation period. In another example, cells located in sensitive airport coverage areas can be removed from the list of cells designated for configuration parameter updates. In another example, special "VIP" cells for which no configuration change is desired can be removed from the list of cells designated for configuration parameter updates. In another example, highly-utilized LTE cells can be removed from the list of cells designated for configuration parameter updates in order not to degrade existing users' quality of service share with added capacity due to a coverage extension. Highly-utilized LTE cells can refer to LTE cells that show average/maximum physical resource block (PRB) utilization for downlink, uplink or both links above specified thresholds and carry average/maximum number of RRC-connected mode LTE users more than a specified threshold per carrier bandwidth in MHz (e.g., average/max RRC connected user per MHz) during the observation period. Combinations of any of the foregoing can be filtered/removed from the list of cells designated for configuration parameter updates. In some embodiments, the filtering (step 332) can occur before the new configuration parameters are generated (step 331).

In step 333, the new parameters are configured on the LTE cells for example, during the network's maintenance window (e.g., 1-4 am). The maintenance window can be used to configure the new parameters in order not to disturb ongoing connections during daytime busy hours. However, the parameters can be configured at other times depending on the operator's policies. For example, implementing parameter changes during the day can shorten the optimization cycle. After step 333, flow chart returns to step 300 to collect new data and identify the worst-performing multi-RAT sectors.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will appreciate the many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various one or more of the aspects described above. In some embodiments, computer readable media may be non-transitory media.

The terms "program" and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method to be implemented in a computing device, the method comprising:
identifying multi-RAT sectors in the multi-RAT cellular network, each multi-RAT sector corresponding to at least a first cell that supports a first RAT and a second cell that supports a second RAT but that does not support the first RAT, the first and second cells being co-located and having cell azimuths within an acceptance margin of one another;
analyzing multi-RAT sector key performance indicators (KPIs) of each multi-RAT sector to determine one or more worst-performing multi-RAT sectors, the multi-RAT sector KPIs including (1) a ratio of first RAT-capable UE traffic in an RRC connected state served by all second RAT carrier(s) belonging to the multi-RAT sector to all UEs served in second RAT carriers in the RRC connected state (Served % NotOnFirstRAT);
identifying a cellular network geographical problem area having second RAT cellular coverage but not having first RAT cellular coverage, the cellular network geographical problem area identified for the one or more worst-performing multi-RAT sectors based, at least in part, on geographical bin KPIs for a geographical subset of the one or more worst-performing multi-RAT sectors; and
updating configuration parameters of one or more cells of each worst-performing multi-RAT sector that support the first RAT to improve a signal level in each cellular network geographical problem area.

2. The method of claim 1, wherein the multi-RAT sector KPIs further include (2) a ratio of RRC (radio resource control) setup failures to total RRC setup establishment attempts on the first RAT (ERrc % AccFail), (3) a ratio of abnormal first RAT call terminations due to EnB to total call releases on the first RAT (ERab % Drop), and (3) a ratio of UE (user equipment) context inter radio access technology (IRAT) relocation successes from the first RAT to the second RAT to total first RAT UE context establishments (Irat % Reloc).

3. The method of claim 1, wherein analyzing the multi-RAT sector KPIs comprises calculating a unified cost metric based on the multi-RAT sector KPIs.

4. The method of claim 1, wherein the geographical subset includes a plurality of geographical bins.

5. The method of claim 4, further comprising calculating a weak-coverage degree per bin using a unified cost metric per bin, the unified metric based on the bin KPIs.

6. The method of claim 5, wherein the bin KPIs include ERabDrop and IratReloc.

7. The method of claim 4, further comprising identifying weak coverage symptom events including at least one of (a) a count of inter radio access technology (IRAT) redirection events per bin, (b) a count of abnormal call releases per bin, the count of abnormal call releases per bin measured on the first RAT, or (c) a received power measurement of user equipment located in each bin, the user equipment communicating on the first RAT.

8. The method of claim 4, further comprising identifying a coverage compensator cell for each cellular network geographical problem area, the coverage compensator cell supporting the first RAT.

9. The method of claim 8, further comprising updating the configuration parameters of each coverage compensator cell to increase its signal coverage area.

10. The method of claim 9, wherein the updated configuration parameters include at least one of an electrical tilt increase of an antenna for the coverage compensator cell or a coverage compensator cell power increase.

11. The method of claim 9, further comprising excluding one or more coverage compensator cells from the configuration parameters update.

12. The method of claim 4, further comprising identifying a polluter cell for at least one of the cellular network geographical problem areas, the polluter cell supporting the first RAT.

13. The method of claim 12, further comprising updating the configuration parameters of the polluter cell to decrease its signal coverage area.

14. The method of claim 13, wherein the updated configuration parameters include at least one of an electrical tilt decrease of an antenna for the polluter cell or a polluter cell power decrease.

15. The method of claim 14, further comprising excluding one or more cells from the configuration parameters update.

16. The method of claim 1, further comprising:
identifying an overshooter cell in the target area; and
updating configuration parameters of the overshooter cell to decrease its signal coverage area.

17. The method of claim 1, further comprising:
identifying an undershooter cell in the target area; and
updating configuration parameters of the undershooter cell to increase its signal coverage area.

18. The method of claim 1, wherein the first RAT is an Nth generation mobile communication system and the second RAT is an N−1th generation mobile communication system.

19. The method of claim 18, wherein the first RAT is LTE and the second RAT is UMTS.

20. A non-transitory computer-readable medium having stored thereon program instructions that, when executed by a computer system, cause the computer system to:
identify multi-radio access technology (RAT) sectors in a multi-RAT cellular network, each multi-RAT sector corresponding to at least a first cell that supports a first RAT and a second cell that supports a second RAT but that does not support the first RAT, the first and second cells being co-located and having cell azimuths within an acceptance margin of one another;
analyze multi-RAT sector key performance indicators (KPIs) of each multi-RAT sector to determine one or more worst-performing multi-RAT sectors, the multi-RAT sector KPIs including a ratio of first RAT-capable UE traffic in an RRC connected state served by all second RAT carrier(s) belonging to the multi-RAT sector to all UEs served in second RAT carriers in the RRC connected state (Served % NotOnFirstRAT);
identify a cellular network geographical problem area having second RAT cellular coverage but not having first RAT cellular coverage, the cellular network geographical problem area identified for the one or more worst-performing multi-RAT sectors based, at least in part, on geographical bin KPIs for a geographical subset of the one or more worst-performing multi-RAT sectors; and update configuration parameters of one or more cells of each worst-performing multi-RAT sector that support the first RAT to improve a signal level in each cellular network geographical problem area.

* * * * *